US010134239B2

(12) United States Patent
Park

(10) Patent No.: US 10,134,239 B2
(45) Date of Patent: Nov. 20, 2018

(54) SYSTEM, METHOD AND COMPUTER READABLE RECORDING MEDIUM FOR PROVIDING GAME THROUGH CONNECTION WITH CHALLENGE OPPONENT

(71) Applicant: K-INNOVATION, Seongnam-si (KR)

(72) Inventor: So Youn Park, Seongnam-si (KR)

(73) Assignee: K-INNOVATION, Seongnam-si (KR)

( * ) Notice: Subject to any disclaimer, the term of this patent is extended or adjusted under 35 U.S.C. 154(b) by 1117 days.

(21) Appl. No.: 13/724,445

(22) Filed: Dec. 21, 2012

(65) Prior Publication Data

US 2013/0165229 A1 Jun. 27, 2013

(30) Foreign Application Priority Data

Dec. 21, 2011 (KR) ........................ 10-2011-0139299

(51) Int. Cl.
*A63F 9/24* (2006.01)
*A63F 13/00* (2014.01)
(Continued)

(52) U.S. Cl.
CPC ...... *G07F 17/3272* (2013.01); *G07F 17/3225* (2013.01)

(58) Field of Classification Search
CPC .. A63F 13/12; A63F 13/235; A63F 2300/205; G07F 17/3272; G07F 17/3225
(Continued)

(56) References Cited

U.S. PATENT DOCUMENTS

2005/0070359 A1* 3/2005 Rodriquez .............. A63F 13/12 463/42
2006/0287096 A1* 12/2006 O'Kelley, II ........... A63F 13/12 463/42
(Continued)

FOREIGN PATENT DOCUMENTS

JP 2002-253864 9/2002
JP 2005-270649 10/2005
(Continued)

OTHER PUBLICATIONS

Square Enix Inc., "Blur Racerz," Industrial Property Information Training Center, Jul. 23, 2010, pp. 1-17.
(Continued)

*Primary Examiner* — Omkar Deodhar
*Assistant Examiner* — Wei Lee
(74) *Attorney, Agent, or Firm* — H.C. Park & Associates, PLC

(57) ABSTRACT

A method for providing a game through a connection with a challenge opponent, performed by a game service platform server managing a plurality of games, the method including: receiving challenge game selection information and challenge opponent request information of a challenge applicant from a first user terminal; transmitting challenge application information to a second user terminal, which is a terminal of at least one member specified based on the challenge opponent request information; and setting the member accepting a challenge to the challenge opponent based on challenge acceptance information received from the second user terminal. The first user terminal and the second user terminal execute a game service platform managing the plurality of games and provide the challenge opponent request information and the challenge acceptance information through the game service platform, respectively.

15 Claims, 13 Drawing Sheets

(51) Int. Cl.
*G06F 17/00* (2006.01)
*G06F 19/00* (2018.01)
*G07F 17/32* (2006.01)

(58) Field of Classification Search
USPC .......................................................... 463/40
See application file for complete search history.

(56) References Cited

U.S. PATENT DOCUMENTS

| | | | | |
|---|---|---|---|---|
| 2008/0113815 | A1* | 5/2008 | Weingardt | G07F 17/3276 463/42 |
| 2011/0047237 | A1* | 2/2011 | Walsh | G06Q 10/10 709/207 |
| 2012/0178536 | A1* | 7/2012 | Oh et al. | 463/42 |
| 2012/0214568 | A1* | 8/2012 | Herrmann | 463/16 |

FOREIGN PATENT DOCUMENTS

| | | |
|---|---|---|
| JP | 2005-319047 | 11/2005 |
| JP | 2008-538318 | 10/2008 |
| JP | 2008-546469 | 12/2008 |
| JP | 2009-247548 | 10/2009 |
| JP | 2010-284273 | 12/2010 |
| JP | 2011-500277 | 1/2011 |
| KR | 10-2000-0060795 | 10/2000 |
| KR | 10-2002-0089856 | 11/2002 |
| KR | 10-2003-0088621 | 11/2003 |
| KR | 10-1069292 | 10/2011 |

OTHER PUBLICATIONS

"Social games, munchimyeon ripple effect also times!" IT News 24, May 4, 2011, <news.inews24.com/php/view_print.php?g_serial=570872>.

Naoki Nozawa, et al., "iPad Perfect Manual for iOS 4," Dec. 31, 2010, pp. 191-196, Sotec Co., Japan.

"NTT DoCoMo, new series and new product announcement meeting held appearance 'Kingdom Hearts' and 'Lost Planet' is in pre-installed," Nov. 5, 2008, Impress Watch Corporation, Japan, available at http://game.watch.impress.co.jp/docs/20081105/docomo.htm.

* cited by examiner

FIG. 7C
SHOW
11:43
CHALLENGE TO MY FRIEND
CHOOSE FRIEND TO CHALLENGE
CHALLENGE >
•GAME SELECTION
•CHALLENGE TIME
MY FRIEND
24
MY FRIEND
FRIEND OF FRIEND
B
D
E
H
SEE MORE
TOP
CHALLENGE >

SYSTEM, METHOD AND COMPUTER READABLE RECORDING MEDIUM FOR PROVIDING GAME THROUGH CONNECTION WITH CHALLENGE OPPONENT

CROSS-REFERENCE TO RELATED APPLICATION

This application claims priority from and the benefit of Korean Patent Application No. 10-2011-0139299, filed on Dec. 21, 2011, which is hereby incorporated by reference for all purposes as if fully set forth herein.

BACKGROUND

Field

Exemplary embodiments of the present invention relate to a method, a system, and a computer readable recording medium for providing a game through a connection with a challenge opponent and, more particularly, to a method, a system, and a computer readable recording medium for providing a game through a connection with a challenge opponent of selecting a challenge game and a challenge opponent through a game service platform providing a plurality of game services and providing challenge related information according to a challenge progress and result of the selected game.

Discussion of the Background

In accordance with the improvement in performance of smart phones that have been recently released, many users tend to leave general cellular phones for smart phones. The smart phone, which is an intelligent cellular phone having computer support functions added to the cellular phone, has a personal digital assistant (PDA) function, the Internet function, a moving picture reproducing function, and the like, added thereto while satisfying cellular phone functions, and includes various input schemes and touch screens to provide an interface that is more convenient for use. In addition, because the smart phone supports a wireless Internet function, it can also access the Internet and a computer to perform the functions of a terminal, such as an E-mail function, a web browsing function, a fax function, a banking function, a game function, and the like. The smart phone also has a standardized operating system (OS) or a dedicated operating system in order to accommodate various functions.

As described above, as implementation of various functions has been enabled through various user terminals such as the smart phone and the like, various application programs and contents driven in the user terminal apparatus have been developed. In addition, as the functions of a mobile terminal of the user terminals have been improved, many mobile games that may be variously played in an environment similar to a web environment have been developed. Therefore, many network games in which users accessing a network through their mobile terminals may play the same game together with each other have also been developed. In this case, generally, game clients are mounted in user terminals or client terminals (for example, smart phones) and connected with each game server through a wired and wireless communication network to serve to perform a corresponding game on the user terminals.

As an example of the technology of connecting the same game among smart phone users through the wireless Internet, there is Korean Patent Laid-Open Publication No. 2003-0088621 (entitled "SYSTEM FOR CONNECTING WIRELESS GAME BY CONDITION MATCHING OF PARTICIPANT AND SMS AND METHOD THEREFOR, WISPOST, INC)" (Document 1). Korean Patent Laid-Open Publication No. 2003-0088621 discloses a game relaying system and method of informing unspecified users that intend to participate in a game in the wireless Internet by a short message service (SMS) that the unspecified users may participate in the game in the case in which conditions of the unspecified users are matched with each other, and immediately connecting recipients with each other when the recipients participate in the game.

However, in the mobile games according to the related art including the mobile game disclosed in the above Document 1, there is a problem in which participation in the game is possible only in the case in which a real time battle among matched game participants is possible, and there is also a problem such that the case in which the game connection is not made in real time as a result of a time delay required for waiting for a short message service response, or the like, frequently occurs. In addition, because a battle with an opponent is ended only once at the time of each connection, a record may not be updated in a game, or the like, of which victory or defeat is determined through a repetitive record, such as a recording game, or the like. Therefore, there is no motivation for record updating. Further, because the matching with the game opponent is implemented only in a specific game, it is impossible to play another kind of game or implement matching with a user that has not played a corresponding game.

SUMMARY

Exemplary embodiments of the present invention provide a method and a system for providing a game through a connection with a challenge opponent capable of providing a game through a battle by selecting a challenge game and a challenge opponent, and then applying for a game challenge to the selected opponent on a game service platform managing a game service in interconnection with a plurality of games provided in a user terminal.

Exemplary embodiments of the present invention also provide a method and a system for providing a game through a connection with a challenge opponent capable of providing a game through a battle by selecting a challenge game, searching and selecting a challenge opponent by various methods, and then applying for a game challenge to the selected opponent on a game service platform managing a game service in interconnection with a plurality of games provided in a user terminal.

Exemplary embodiments of the present invention also provide a method and a system for providing a game through a connection with a challenge opponent capable of providing a game through a battle by selecting a challenge game and setting challenge information such as a period, the number of persons, and the like, on a game service platform managing a game service in interconnection with a plurality of games provided in a user terminal.

Exemplary embodiments of the present invention also provide a method and a system for providing a game through a connection with a challenge opponent capable of progressing a game through a battle by selecting a challenge game and a challenge opponent and applying for a game challenge to the selected opponent and providing game processing situations and results to the respective participants on a game service platform managing a game service in interconnection with a plurality of games provided in a user terminal.

Additional features of the invention will be set forth in the description which follows, and in part will be apparent from the description, or may be learned by practice of the invention.

An exemplary embodiment of the present invention discloses a method for providing a game through a connection with a challenge opponent, performed by a game service platform server managing a plurality of games, the method including: receiving challenge game selection information and challenge opponent request information of a challenge applicant from a first user terminal; transmitting challenge application information to a second user terminal, which is a terminal of at least one member specified based on the challenge opponent request information; and setting the member accepting a challenge to the challenge opponent based on challenge acceptance information received from the second user terminal. The first user terminal and the second user terminal execute a game service platform managing the plurality of games and provide the challenge opponent request information and the challenge acceptance information through the game service platform, respectively.

An exemplary embodiment of the present invention also discloses a system for providing a game through a connection with a challenge opponent, the system including a game service platform server including: a challenge opponent searching unit configured to receive challenge game selection information and challenge opponent request information of a challenge applicant from a first user terminal; a challenge proposal processing unit configured to transmit challenge application information to a second user terminal, which is a terminal of at least one member specified based on the challenge opponent request information; and a challenge acceptance processing unit configured to set the member accepting a challenge to the challenge opponent based on challenge acceptance information received from the second user terminal. The first user terminal and the second user terminal are configured to execute a game service platform managing the plurality of games and to provide the challenge opponent request information and the challenge acceptance information through the game service platform, respectively.

An exemplary embodiment of the present invention also discloses that information for receiving the method for providing a game through a connection with a challenge opponent may be stored in a non-transitory computer-readable storage medium including an executable program which, when executed, provides the game. The recording medium may include all kinds of recording media in which a program and data are stored so as to be readable by a computer system. The recording medium may include a read only memory (ROM), a random access memory (RAM), a compact disk (CD), a digital video disk (DVD) ROM, a magnetic tape, a floppy disk, an optical data storage, or the like, and a medium implemented in a form of a carrier wave (for example, transmission through the Internet). In addition, the recording medium may be distributed in a computer system connected by a network, such that a computer readable code may be stored and executed in a distributed scheme.

An exemplary embodiment of the present invention also discloses a method for providing a game through a connection with a challenge opponent, performed by a game service platform server managing a plurality of games, the method including: receiving challenge application information from a first user terminal, the challenge application information including a selected challenge application opponent; transmitting challenge application information to a second user terminal, which is a terminal of the selected challenge application opponent; and setting the challenge application opponent as a challenge opponent in response to receiving challenge acceptance information from the second user terminal. The first user terminal and the second user terminal execute a game service platform managing the plurality of games and provide the selection of the challenge application opponent and the challenge acceptance information through the game service platform, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are intended to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
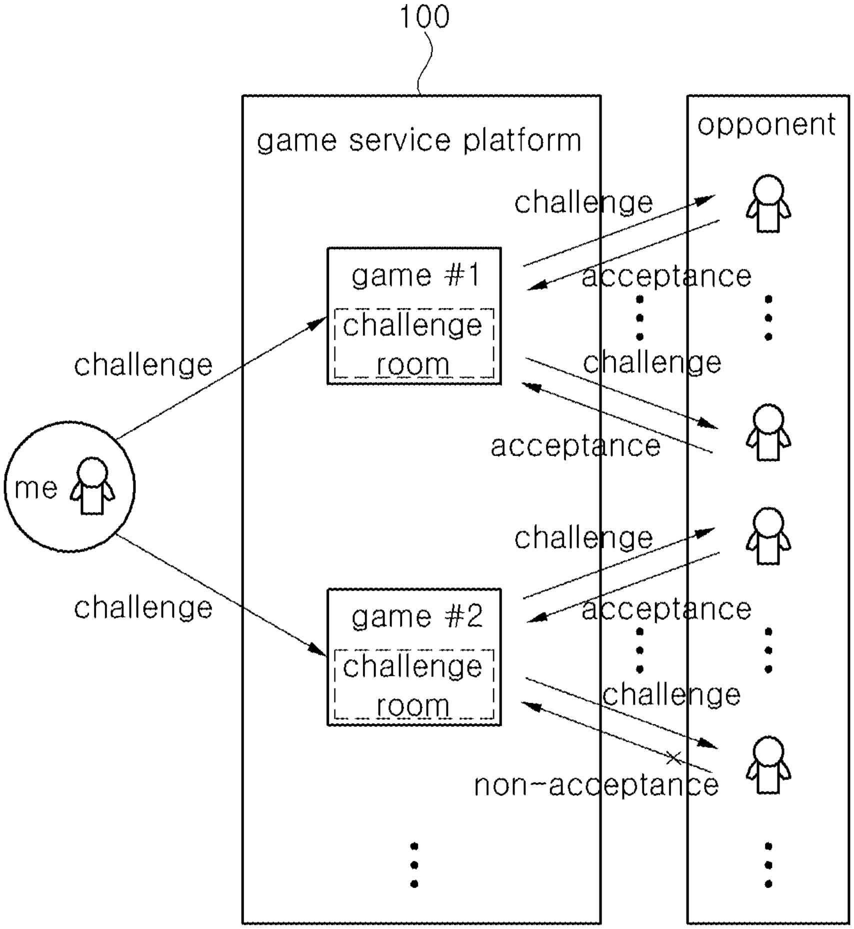
FIG. 1 is a conceptual diagram showing providing a game through connection with a challenge opponent according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. For example, specific shapes, configurations, and characteristics described in an exemplary embodiment of the present invention may be implemented in another exemplary embodiment without departing from the spirit and the scope of the present invention. In addition, it should be understood that position and arrangement of individual components in each disclosed exemplary embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawing. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The present invention suggests a method and a system for providing a game through a connection with a challenge opponent capable of providing a game through a battle by selecting a challenge game and a challenge opponent, and applying for a game challenge to the selected opponent on a game service platform managing a game service in interconnection with a plurality of games.

That is, according to an exemplary embodiment of the present invention, a procedure of searching challenge opponents and selecting an opponent to challenge among the searched challenge opponents is performed on the game service platform interconnected with the plurality of games. Therefore, one may select a specific game among the plurality games provided on the game service platform before determining the challenge opponent. According to an exemplary embodiment of the present invention, the challenge opponent to battle against may be a user that has experienced or installed the selected game or a user that has experienced another game on the game service platform among users that have not experienced the selected game. In the case in which the selected game is not installed in the user terminal of the challenge opponent that has accepted the challenge, a procedure of automatically downloading and installing installation software of the game may be added.

Further, according to an exemplary embodiment of the present invention, a challenge proposer may additionally set the number of challenge opponents and a challenge period. Therefore, the game is repeatedly performed several times during the challenge period, thereby making it possible to instill a competitive spirit among the challengers. The present invention may also be applied to a record game played by the respective challengers to calculate records rather than the game played in real time among the challenge opponents. As described above, records updated by the respective challengers during the challenge period may be reported in real time to the user terminals (for example, smart phones) of other challengers and/or the challenge proposer.

Further, when the challenge period is ended, a challenge result may be provided to the user terminals of the respective challengers and/or the challenge proposer, and the user may directly inquire and view the challenge result. In this case, a point or various kinds of benefits may be provided to the respective challengers and/or the challenge proposer according to the challenge result.

According to the exemplary embodiment of the present invention, information related to the challenge may be interconnected with a social network service (hereinafter, referred to as an 'SNS' server) to thereby be shared through a corresponding SNS page. Further, the present invention is interconnected with the SNS service, such that a human network among the respective game users may be expanded.

In addition, in the present invention, a method for selecting challenge opponents may be variously implemented. For example, the server may search rivals having ability matched to the ability of a corresponding user and recommend the rivals as the challenge opponents, or search other users positioned in the vicinity of a region at which the user is positioned and provide other users as the challenge opponents, or the user may select friends registered by him/her as the challenge opponents. Further, the server may also randomly determine these various methods to determine and provide fateful opponents. The method for selecting challenge opponents according to an exemplary embodiment of the present invention is not limited to the above-mentioned methods, but may be embodied in other methods.

Although the case in which the present invention is applied to a 'smart phone' will be described in the following detailed description for clarity, the present invention may be applied to any user terminal capable of providing a function of the present invention, as well as the smart phone. For example, the present invention may be applied to all user terminals capable of executing an application, including a fixed terminal such as a computer, a television, or the like, as well as a mobile terminal such as a cellular phone, a laptop computer, a digital broadcasting terminal, a personal digital assistant (PDA), a portable multimedia player (PMP), a navigation apparatus, or the like.

In addition, in the specification of the present invention, a term 'game service platform' is the widest concept indicating a software framework (including an application program framework) providing each game related information and integrated management of services in interconnection with at least one game program (such as a plurality of game programs) according to the present invention. That is, the game service platform may become a basis on which each individual game software may be executed and allow execution of the program not to be limited to a specific operating system.

In addition, the game service platform is mounted in the smart phone to integrate and manage at least one game software and provide various services in interconnection with each game software. For example, the game service platform provides an interface allowing each user to access each game and provides various records and statistical data related to each game. In addition, various methods capable of searching challenge opponents according to an exemplary embodiment of the present invention are provided, such as a challenge proposal process, a challenge acceptance process, and the like, and various challenge related information according to setting and progress of the challenge is stored and managed in a memory and is provided to each user terminal in real time or by a request.

Hereinafter, exemplary embodiments of the present invention will be described in detail with reference to the accompanying drawings so that those skilled in the art may easily implement the spirit of the present invention.

Prior to describing the method and the system for providing a game through a connection with a challenge opponent according to an exemplary embodiment of the present invention, a concept of the game service platform managing information on each game in interconnection with a plurality of games, processing information related to the challenge, and providing various related service will be described. Although the method for providing a game through a connection with a challenge opponent according to an exemplary embodiment of the present invention may be implemented in each game program without installing a separate game service platform in the smart phone, the method for providing a game through a connection with a challenge opponent according to an exemplary embodiment of the present invention may be implemented on the game service platform in order to determine a game to challenge, search and select challenge opponents, and progress a challenge according to challenge proposal and acceptance.

Concept of Game Service Platform

The game service platform according to an exemplary embodiment of the present invention may allow a service user to selectively use a plurality of games through an integrated log-in process and integrate and manage information related to the plurality of provided games, thereby providing a basis capable of facilitating challenge related procedure progress and related information management according to an exemplary embodiment of the present invention.

In addition, the game service platform may allow the service user to register his/her acquaintance as a game friend and allow the service user to access a game played by the acquaintance or play the corresponding game together with the acquaintance through the registered game friend. Further, the game service platform may allow the service user to play a specific game together with a stranger accessing the specific game or to register the stranger playing the game together with him/her as a game friend, thereby forming a social network based on a game.

Therefore, the service user, the service, and the game are organically interconnected with each other through the game service platform according to an exemplary embodiment of the present invention to expand a relationship among the service users, thereby making it possible to increase pleasure. Further, a game oriented service capable of continuing an experience and a value may be provided through the game service platform according to an exemplary embodiment of the present invention.

A challenge related menu and service according to an exemplary embodiment of the present invention may be implemented as a detailed menu after the game service platform is executed, or may be implemented as a separate application so as to be executed in interconnection with the game service platform when it is executed.

Concept of Connection with Challenge Opponent

FIG. 1 is a diagram showing a concept of providing a game through connection with a challenge opponent according to an exemplary embodiment of the present invention. As shown in FIG. 1, a game service user may access a plurality of games through the game service platform to play the respective games. That is, as described above, the game service platform integrates and manages the plurality of games and provides a channel capable of selecting and playing the respective games to the service user.

According to an exemplary embodiment of the present invention, the service user selects a specific game and selects an opponent to challenge with respect to the corresponding game, through the game service platform, to propose the challenge to the opponent. In this case, the opponent receiving the challenge proposal may or may not accept the challenge proposal.

A challenge room is generated with respect to the corresponding game according to the challenge and the service user that has proposed the challenge and the opponent that has accepted the challenge are registered in the challenge room, such that a play result of the corresponding game is managed and various services related to the challenge are provided. In this case, an opponent that has not accepted the challenge is also registered in the challenge room, such that the same challenge procedure may progress with respect to the opponent that has not accepted the challenge, but only processing for the challenge result may not be provided to the opponent that has not accepted the challenge.

In addition, as shown in FIG. 1, the service user may set the number of challengers and a challenge period with respect to one challenge. Therefore, the service user may propose the challenge to a plurality of opponents. Further, a plurality of challenge rooms may be generated with respect to the same game, and a plurality of challenge rooms may be generated according to several challenge proposals at the same time with respect to each of a plurality of games.

Figure 2:
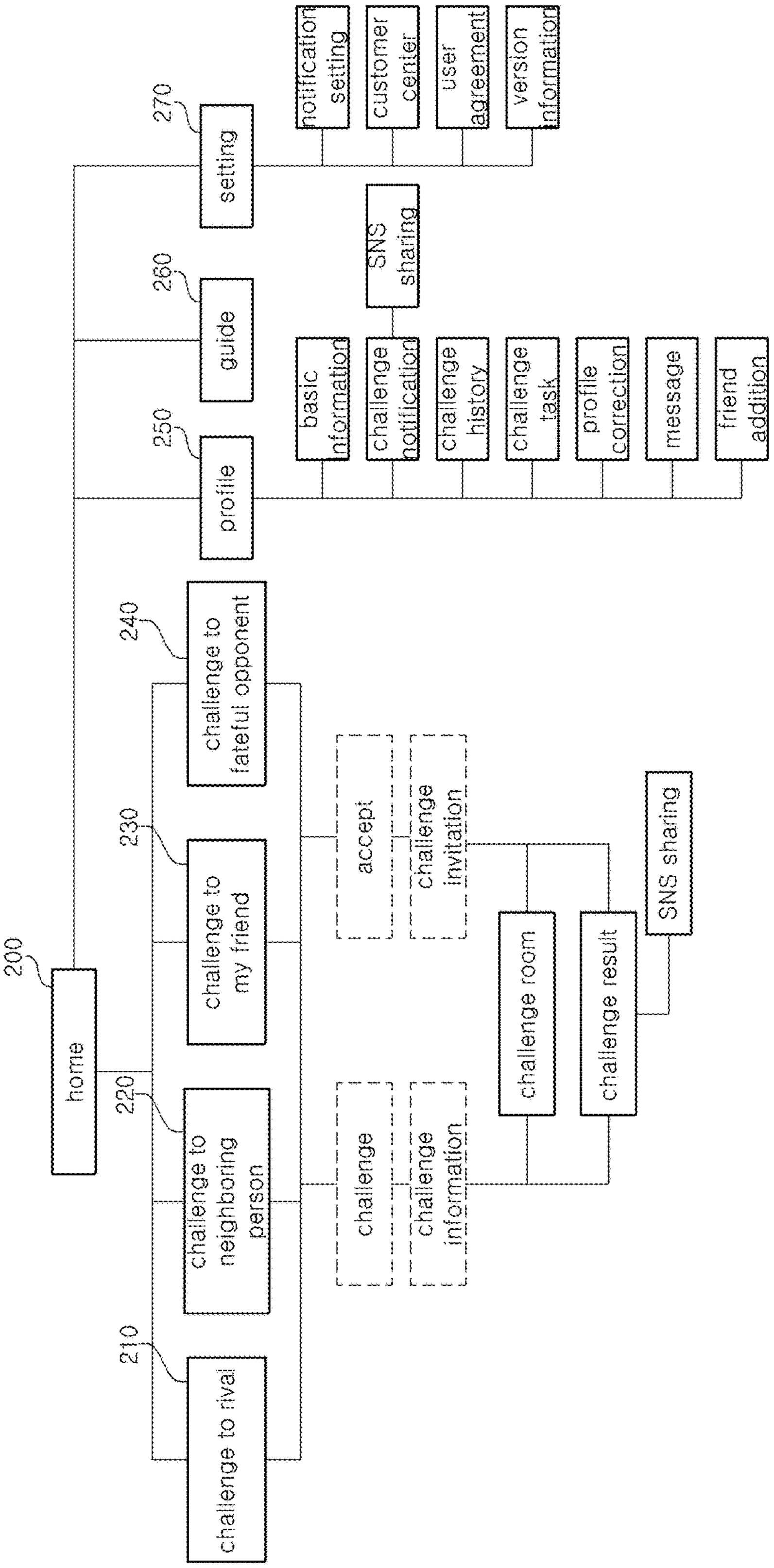
FIG. 2 is a diagram showing an example of menu implementation through a game service platform according to an exemplary embodiment of the present invention.
Figure 6:
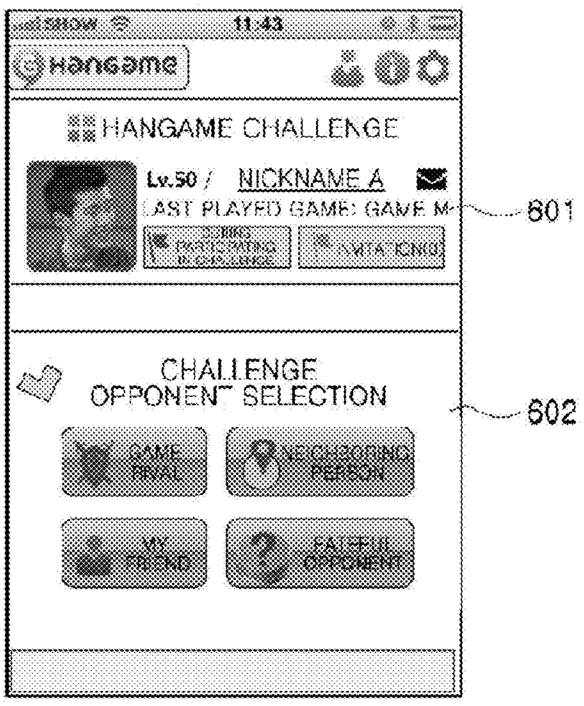
FIG. 6 is a diagram showing a "challenge opponent selection" screen in a smart phone according to an exemplary embodiment of the present invention.

FIG. 2 is a diagram showing an example of menu implementation through a game service platform according to an exemplary embodiment of the present invention. As shown in FIG. 2, when log-in is made through a home menu 200 of the game service platform (or a home menu of a challenge service), various menus capable of searching challenge opponents may be displayed, as shown in FIG. 6.

Figure 9:
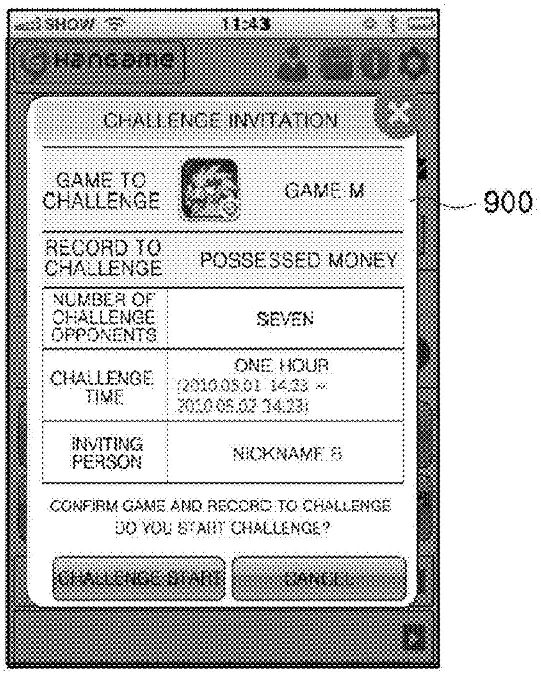
FIG. 9 is a diagram showing a "challenge invitation screen" in the smart phone according to an exemplary embodiment of the present invention.

In this case, when a challenge proposal selects the respective challenge opponent search menus to search the challenge opponents and select a specific opponent as a challenge subject, the challenge proposal is executed, and the challenge proposer sets various information (for example, the number of challenge participants, a challenge progress period, and the like) regarding the challenge. The challenge opponent receiving the challenge proposal may accept or reject the challenge proposal, confirm a challenge invitation as shown in FIG. 9, and start the challenge.

As described above, when the challenge starts, the challenge room is generated, a record for the challenge is managed as the challenge progresses, and a challenge result is generated after the challenge ends, such that the challenge result may be transmitted to or viewed by the respective challenge participants. According to an exemplary embodiment of the present invention, the challenge result is interconnected with the SNS service, such that information may be shared.

A method of searching and challenging the challenge opponent may be variously implemented. More specifically, the method of searching and challenging the challenge opponent may be implemented as various methods such as challenge to rival 210, challenge to neighboring person 220, challenge to my friend 230, challenge to fateful opponent 240, and the like, as shown in FIG. 2. The “challenge to rival” menu 210 searches and recommends persons having game ability similar to that of the service user, and the “challenge to neighboring person” menu 220 searches and recommends users positioned in the vicinity using position information of the user terminal. In addition, the “challenge to my friend" menu 230 searches and recommends friends set by the service user in the game service platform, the challenge service, or the respective games or friends stored in an address book or a phone book, and the "challenge to fateful opponent" menu 240 randomly selects one of the respective search methods described above to search and recommend the user.

In addition, a profile menu 250 capable of viewing and correcting various profiles of the service user, a guide menu 260 guiding a service using method, a setting menu 270 capable of changing various settings, and the like, may be additionally configured. The profile menu 250 may include detailed items such as basic information, a challenge notification, a challenge history, a challenge task, profile correction, a message, friend addition, and the like. Here, the challenge notification item may be displayed with respect to an event in which the service user proposes the challenge or receives the challenge proposal in relation to the challenge, and a recent challenge history and a recent challenge task may be confirmed through the challenge history item or the challenge task item. In the setting menu 270, notification methods, notification periods, and the like, of various notifications (for example, a challenge invitation notification, a challenge end notification, a friend addition notification, a challenge opponent record notification, and the like) related to the challenge progress may be set.

Hereinafter, a system according to an exemplary embodiment of the present invention and detailed components thereof will be described with reference to FIGS. 3 and 4, and a challenge progress procedure according to an exemplary embodiment of the present invention will be described with reference to FIG. 5.

Configuration of Entire System

Figure 3:
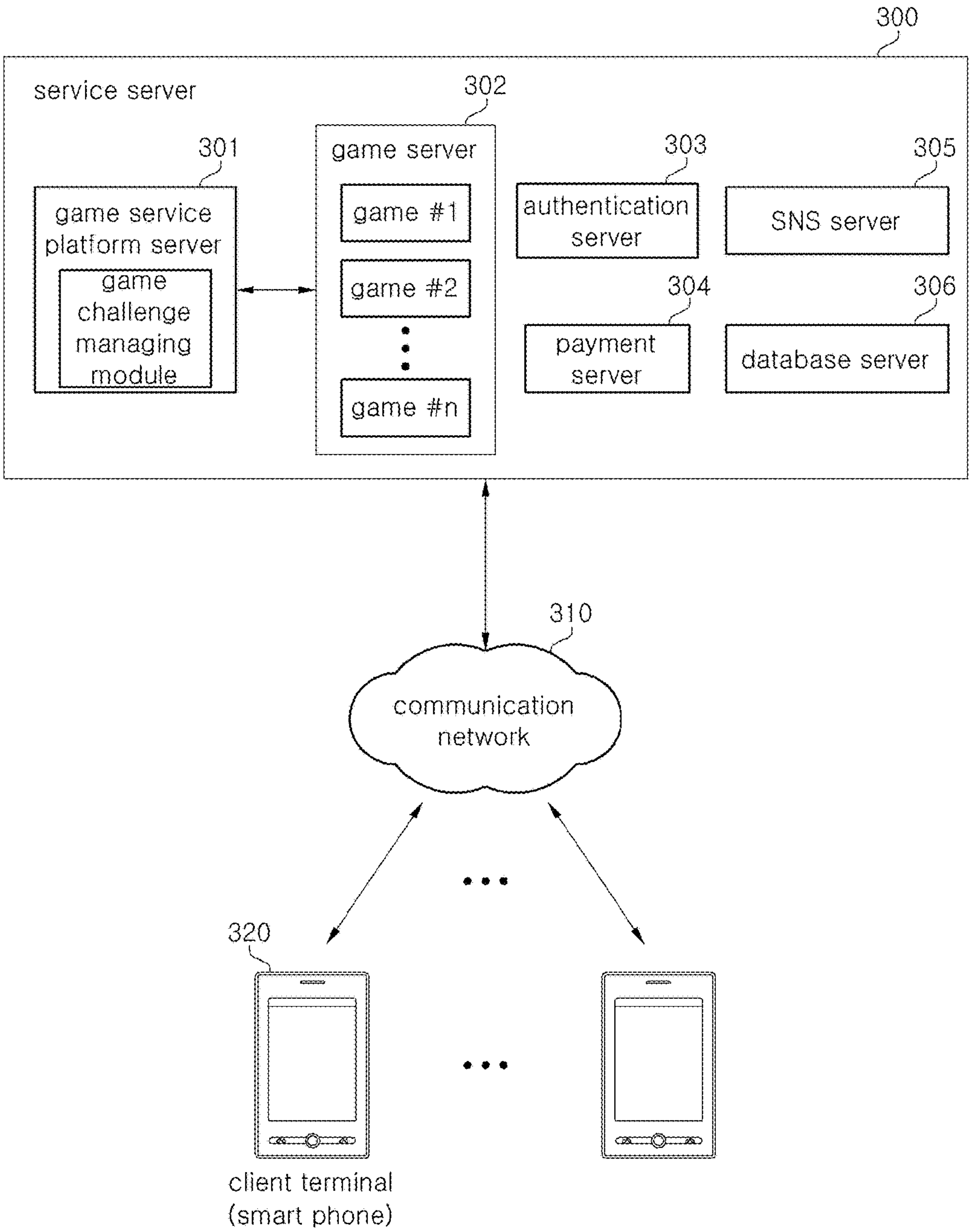
FIG. 3 is a diagram showing a system for providing a game through the connection with a challenge opponent according to an exemplary embodiment of the present invention.

FIG. 3 is a diagram showing a system for providing a game through the connection with a challenge opponent according to an exemplary embodiment of the present invention.

As shown in FIG. 3, in the entire system according to an exemplary embodiment of the present invention, a service server 300 of a service operator is connected with a plurality of user terminals, that is, client terminals (for example, smart phones) 320 in which the game service platform is performed through a communication network 310. Here, the service server 300 may include a game service platform server 301, a game server 302, an authentication service 303, a payment server 304, an SNS server 305, a database server 306, and the like, wherein the game server 302 may perform functions for each game so that a plurality of games are driven through the respective client terminals 320.

First, the communication network 310 may be configured regardless of a communication aspect such as wired communication and wireless communication, and may include various communication networks such as a personal area network (PAN), a local area network (LAN), a metropolitan area network (MAN), a wide area network (WAN), or the like. In addition, the communication network 300 described in an exemplary embodiment of the present invention may be the well-known World Wide Web (WWW) and use a wireless transmitting technology used for a short range communication, such as an infrared data association (IrDA) technology or a Bluetooth.

According to an exemplary embodiment of the present invention, the game service platform server 301 interworks with the game server 302 and provides the game service platform to the respective client terminals 320. Particularly, the game service platform server 301 provides main functions of the present invention of searching the challenge opponent and initiating a battle with the selected challenge opponent according to an exemplary embodiment of the present invention to be described below. A detailed function of the game service platform server 301 will be described below in a description of FIG. 4.

The game server 302 may perform a function of providing programs and information related to each corresponding game to the client terminals 320 in order to provide a plurality of various games to the users, and client terminal users may download game applications for each corresponding game from the game server 302 and install and execute the game applications in the client terminals 320. That is, the game server 302 installs the game application in the client terminal 320 in the case in which the game application is not installed in the client terminal 320 and updates an old version of game application with a new version of game application in the case in which a version of the game application is an old version. The game application may also be downloaded from a dedicated download server (not shown) or the game service platform server 301 rather than the game server 302. Further, when the user selects a challenge opponent for a specific game and proposes a challenge, in the case in which the corresponding game is not installed in a client terminal of the challenge opponent receiving the challenge proposal, the game server 320 automatically downloads and installs the corresponding game.

The authentication server 303 performs authentication for the respective client terminals 320, game service platform server 301 accessing authentication for the respective client terminals 320, authentication for the respective game accesses, and the like, and the game service platform server 301 or the game server 302 provides various corresponding servers to the client terminals 320 according to the authentication result.

Because the game server 302 including the plurality of games may calculate a game progress time and a limitation time of the user through communication with the client terminal 320 and provide the calculation result to the client terminal 320, it may also be used to implement a free trial function of allowing the user to play a game free of charge for a predetermined period of time, or a function of allowing the user to play a game only for a limited time through a time-based charge, or the like. In this case, when a specific game is charged as a paid game, the game server 302 provides the corresponding game after a payment is normally made through the payment server 304. In addition, the authentication server 303 may continuously communicate with the server side in order to continuously maintain a network connection during game progress. Therefore, the game server 302 may judge that the network connection is continued through communication with the client terminal 320.

The SNS server 305 provides a social networking service (SNS) (for example, a "me2 day" service) provided by the service operator and provides subscriber information to the game service platform server 301 according to an exemplary embodiment of the present invention, such that information such as a challenge result, or the like, may be shared with the SNS service at the time of progress of the challenge service through the game service platform server 301.

The present invention may interwork with the SNS server 305 operated by the same operator as that of the game service platform server 301 or provide a function of providing information related to SNS services by interworking with SNS servers provided by other operators outside the service server 300.

The database server 306 stores various information required for providing the gamer service platform and the plurality of games to the client terminal 320 according to an exemplary embodiment of the present invention and provides requested information according to requests of the game service platform server 301, the game server 302, the authentication server 303, the payment server 304, the SNS server 305, and the like. The requested information may include game service platform execution related information, game application execution related information, authentication information including user information, game related information, challenge related information, and the like.

Here, the game application execution related information may include information required to execute the game application, such as whether the game application has been downloaded in the client terminal 320, a version of the game, an internet protocol (IP) address of the game server 302, and the like. The authentication information including the user information includes user unique information for judging whether a rightful user has executed the game, terminal unique information for judging whether the game has been executed in an authenticated client terminal 320, and the like. The game information may include information regarding an identifier, a nickname, an avatar, an age, sex, a class, a score, a ranking, a point, and the like, of the user, information regarding whether the user has passed through a specific step or has accomplished a specific mission, information regarding whether a trial is a free trial, and information regarding a game limitation time, and the like.

Figure 4:
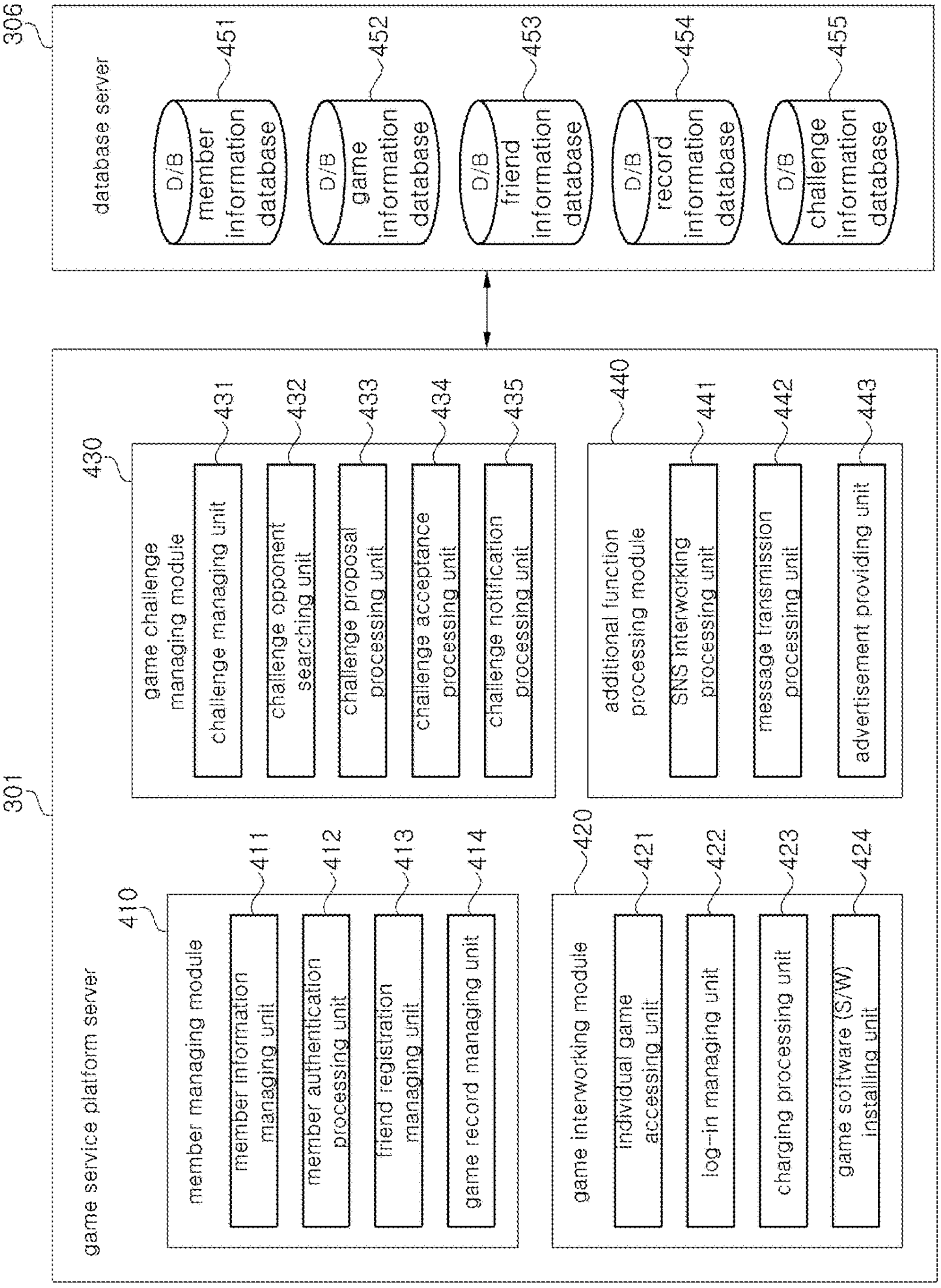
FIG. 4 is a diagram showing detailed structures of a game service platform server and a database server according to an exemplary embodiment of the present invention.

The database server 306 may include a plurality of databases as shown in FIG. 4, and a database including some information or all information may also be positioned in the client terminal 320.

In addition, although not shown, a challenge related server that is in charge of processing for providing the challenge service to the user may be added. The challenge related server may be included in module form in the game service platform server 301 or may be included in the game server 302, or the like, as shown in FIG. 3. Although the case in which the service server 300 includes six detailed servers 301, 302, 303, 304, 305, and 306 has been described in an exemplary embodiment of the present invention, the six servers may be functionally integrated with or separated from each other, servers performing some functions may also be omitted, and a server having an additional function, as described above, may also be added. Therefore, the service server 600 may also be configured of one or more server instead of the six servers.

The client terminal 320 according to an exemplary embodiment of the present invention may be any digital device having an input/output function for communicating with the service server 300 through the communication network 310 in order for the user to perform the game service platform or various games, and may include a memory unit and a microprocessor mounted therein to have calculation capability, such as a desktop computer, a laptop computer, a workstation, a palmtop computer, a personal digital assistant (PDA), a web pad, or the like, as well as a mobile communication terminal including the smart phone.

Game Service Platform Server

According to an exemplary embodiment of the present invention, the game service platform server 301 may be configured to include a member managing module 401, a game interworking module 420, a game challenge managing module 430, an additional function processing module 440, and the like, as shown in FIG. 4. In addition, the database server 306 storing and transmitting various data by interworking the game service platform server 301 may be configured to include a member information database 451, a game information database 452, a friend information database 453, a record information database 454, a challenge information database 455, and the like.

The member managing module 410 manages various personal information that the users register when they subscribe as members to the game service platform or the respective individual games, and manages information regarding friends registered by each member, game records performed during the challenge, and the like. Here, the personal information includes information on a kind of installation game indicating which game each member installs. The game interworking module 420 may allow the game service platform server 301 to interwork with the respective individual games of the game server 302 and allow log-in and charging for the individual games to be integrated and processed in the game service platform. The game challenge managing module 430 searches the challenge opponent, proposes the challenge to the challenge opponent, and processes various functions related to the challenge progress according to acceptance of the challenge according to an exemplary embodiment of the present invention. The additional function processing module 440 provides various functions capable of being additionally provided in connection with the challenge progress.

In this case, some or all of the detailed functions units included in the respective modules 410, 420, 430, and 440 of the game service platform server 301 may also be included in a service platform client application installed in the client terminal 320, and some functions of the detailed function units may interwork with each other or be distributed and processed by the server and the client system.

Hereinafter, detailed functions of the respective modules will be described in detail.

First, the member managing module 410 may include a member information managing unit 411, a member authentication processing unit 412, a friend registration managing unit 413, a game record managing unit 414, and the like. The member information managing unit 411 stores various member related information input in the case in which the respective users access the game service platform server 301 to subscribe to the service through the game service platform in the member information database 451, or updates various member related information corrected through my information home in the game service platform in the member information database 451.

The member authentication processing unit 412 performs authentication by interworking with the authentication server 303 in the case in which the respective users subscribing as the member to the game service platform or the respective games log in the game service platform or the respective games. The friend registration managing unit 413 performs a function of managing game friends of corresponding members registered by various methods. The game record managing unit 414 performs a function of managing the respective game records of the corresponding members, game records related to the challenge, or all game records.

The game interworking module 420 may include an individual game accessing unit 421, a log-in managing unit 422, a charging processing unit 423, a game software (S/W) installing unit 424, and the like. The individual game accessing unit 421 performs an interface function of accessing a specific game in the case in which the specific game is selected (for example, a game for a challenge is selected) among a plurality of games provided in the game server 302 interworking with the game service platform server 301. The log-in managing unit 422 performs a function of integrating and processing log-ins of the respective games or individually processing the log-ins of the respective games when the respective users access the respective games through the game service platform. The charging processing unit 423 performs a function of charging for a specific game by interworking with the payment server 304 in the case in which the specific game is a paid game. The game software (S/W) installing unit 424 performs a function of being executed by a challenge acceptance processing unit 434, to be described below, to proceed to a game S/W installing step and then install S/W of the corresponding game, in the case in which the S/W of the corresponding game is not installed in the client terminal when the user receiving the challenge proposal accepts the challenge or when the user accepts the challenge and intends to access the corresponding game according to an exemplary embodiment of the present invention.

The game challenge managing module 430 may include a challenge managing unit 431, a challenge opponent searching unit 432, a challenge proposal processing unit 433, a challenge acceptance processing unit 434, a challenge notification processing unit 435, and the like. The challenge managing unit 431 performs various processing related to the challenge which progresses according to an exemplary embodiment of the present invention. Particularly, the challenge managing unit 431 receives various challenge related information (for example, the number of challengers, a challenge period, a challenge object, and the like) set by the challenge proposer and stores and manages them in the challenge information database 455.

The challenge opponent searching unit 432 has a function of allowing the user (that is, the challenge proposer) that intends to propose the challenge to search the challenge opponents by various challenge opponent search methods (for example, rival search, neighboring person search, my friend search, fateful opponent search, and the like) according to an exemplary embodiment of the present invention. For example, in the case in which the challenge proposer selects the 'challenge to rival" item, the challenge opponent searching unit 432 searches users having a level of ability (or record) that is the most similar to that of the challenge proposer, and displays a list of the searched users. That is, the record information of the challenge proposer for the corresponding game is confirmed through the record information database 454, and the users having the record in the set range based on the confirmed record information are searched and output. Further, in the case in which the challenge proposer selects the "challenge to neighboring person," the challenge opponent searching unit 432 confirms position information of the user terminal, searches users positioned to be the closest to the challenge proposer among members accessing the service platforms, and displays a list of the searched users. Further, in the case in which the challenge proposer selects the "challenge to my friend," the challenge opponent searching unit 432 searches game friends registered through the friend registration managing unit 413 and displays a list of the search result or searches friends stored in an address book or a phone book and displays a list of the search result. Further, in the case in which the challenge proposer selects the "challenge to fateful opponent," the challenge opponent searching unit 432 searches users by randomly selecting one of the above-mentioned methods and displays a list of the search result. However, because the challenge opponent should actually be a user accepting the game challenge to play the game, only members installing at least one game from information on a kind of installation game among personal information of the members may be searched as the challenge opponents. However, the challenge proposer is not limited to the members installing the selected game. In addition, in the case in which the challenge proposer only installs the selected corresponding game and has not yet played the game once, because game record information is not present, a game level of the challenge opponent may not be present. In consideration of this case, record information (game level) of the challenge proposer for the corresponding game may be confirmed, and record information (game level) of the challenge opponent may be set to be positioned in a range set from the record information (game level) of the challenge proposer by, for example, increasing the game level of the challenge proposal by 10% or adding 10 to the game level of the challenge proposer. The record information (game level) arbitrarily set as described above may be used in the case in which the challenge proposer selects the "challenge to rival" item.

The challenge proposal processing unit 433 performs a function of processing the challenge proposal to a specific user in the case in which the specific user among users searched through the challenge opponent searching unit 432 is selected as the challenge opponent. For example, the challenge proposal processing unit 433 displays the challenge proposal by transmitting a message to the selected challenge opponent, transmitting an alarm, or generating a pop-up window, and discards the challenge proposal in the case in which acceptance for the challenge proposal is not processed in a set period. The challenge acceptance processing unit 434 performs the processing for the challenge acceptance according to whether the challenge acceptance is selected in the case in which the challenge is proposed through the challenge proposal processing unit 433. That is, the challenge acceptance processing unit 434 registers information of the user accepting the challenge as the challenge opponent in the corresponding challenge room. The challenge acceptance processing unit 434 may confirm whether the game for the challenge has been installed in the user terminal of the user accepting the challenge and allow the game to be downloaded through the above-mentioned game S/W installing unit 424 in the case in which the game for the challenge has been installed in the user terminal. An example of a method of downloading the game includes a method of providing a link capable of allowing the game to be downloaded directly from a server in which the game is stored, a method of performing a direct connection with the corresponding link, a method of executing a program capable of downloading the corresponding game, such as iTunes or Android market, or the like, but is not limited thereto. After the game is downloaded, the processing for the challenge acceptance is again performed. The challenge notification processing unit 435 performs notification processing to the user terminals of the corresponding challenge proposer and/or the respective challenge opponents through various means (for example, a pop-up window, a message, a short message, an image of a background screen, a text, an alarm, and the like) at the time of occurrence of various events (for example, challenge start, challenge end, record updating, object accomplishment, and the like) related to the challenge progress in the case in which the challenge starts.

As described above, the respective function units of the game challenge managing module 430 provide various functions related to the challenge progress by various methods according to an exemplary embodiment of the present invention.

The additional function processing module 440 may include an SNS interworking processing unit 441, a message transmission processing unit 442, an advertisement providing unit 443, and the like, so as to provide functions in addition to the function of the game challenge managing module 430 or various additional functions provided by the game service platform according to an exemplary embodiment of the present invention. The SNS interworking processing unit 441 processes the game record, the challenge result record, and the like, according to the challenge progress so as to be provided in interconnection with the interconnected SNS service, as described above. The message transmission processing unit 442 provides a function of transmitting various messages required at the time of executing the service platform or progressing the challenge. The advertisement providing unit 443 performs a function of providing information or an advertisement related to various games interworking with each other through the game service platform, particularly a function of providing an advertisement to various pages related to a challenge service.

Various functions related to the present invention included in the game service platform server 301 may be driven by interworking with the game service platform client application installed in the client terminal for driving the game service platform, some of them may be included in the service platform client application of the client terminal 320, such that the client terminal 320 itself drives and provides the corresponding functions without participation by the server, or the client terminal 320 may receive information from the game service platform server 301 such that it proactively performs the corresponding functions. That is, various functions according to an exemplary embodiment of the present invention may be performed in the server, in the client terminal, or by interworking between the server and the client terminal.

Database Server

The database server 306 may include the member information database 451, the game information database 452, the friend information database 453, the record information database 454, the challenge information database 455, and the like, and may further include other databases required for providing the game service platform according to an exemplary embodiment of the present invention.

The member information database 451 stores personal information of members subscribing as service members or game members through the game service platform. The personal information of the members may include, for example, personal information of corresponding members, photographs of the corresponding members required for profile information, nicknames of the corresponding members, games last played by the corresponding members, kinds of games installed by the corresponding members, result or record information of the corresponding members on each game, challenge history information of the corresponding members, SNS subscription information of the corresponding members, personal information exposure setting information of the corresponding members, automatic log-in setting information of the corresponding members, and the like.

The game information database 452 stores information regarding the plurality of games interworking with the game service platform server 301. This information may include, for example, information regarding installation software information of each game, firmware upgrade software information, version information of each game, record information of each game, challenge task information of each game, interworking path information with the game service platform server 301, subscriber information regarding subscribers subscribing to the corresponding games, and the like.

The friend information database 453 stores various information automatically registered through the game service platform or directly registered by the users and related to the game friends. This information may include, for example, ID and nickname information of the registered friend, registration path information, friend blocking information, and the like. In addition, the users playing the game together through the challenge opponent search may also be registered and stored as the friends.

The record information database 454 stores various records according to game play results of the respective members. Various records may include, for example, the number of plays for each game, play points of each member for each game, challenge task points, and the like.

The challenge information database 455 stores various pieces of information related to the challenge progress. These various pieces of information may include, for example, challenge setting information (challenge participant information, a challenger limit, a challenge time, and the like), challenge record information, challenge object information, challenger ranking information, and the like.

Entire Service Procedure

Figure 5A:
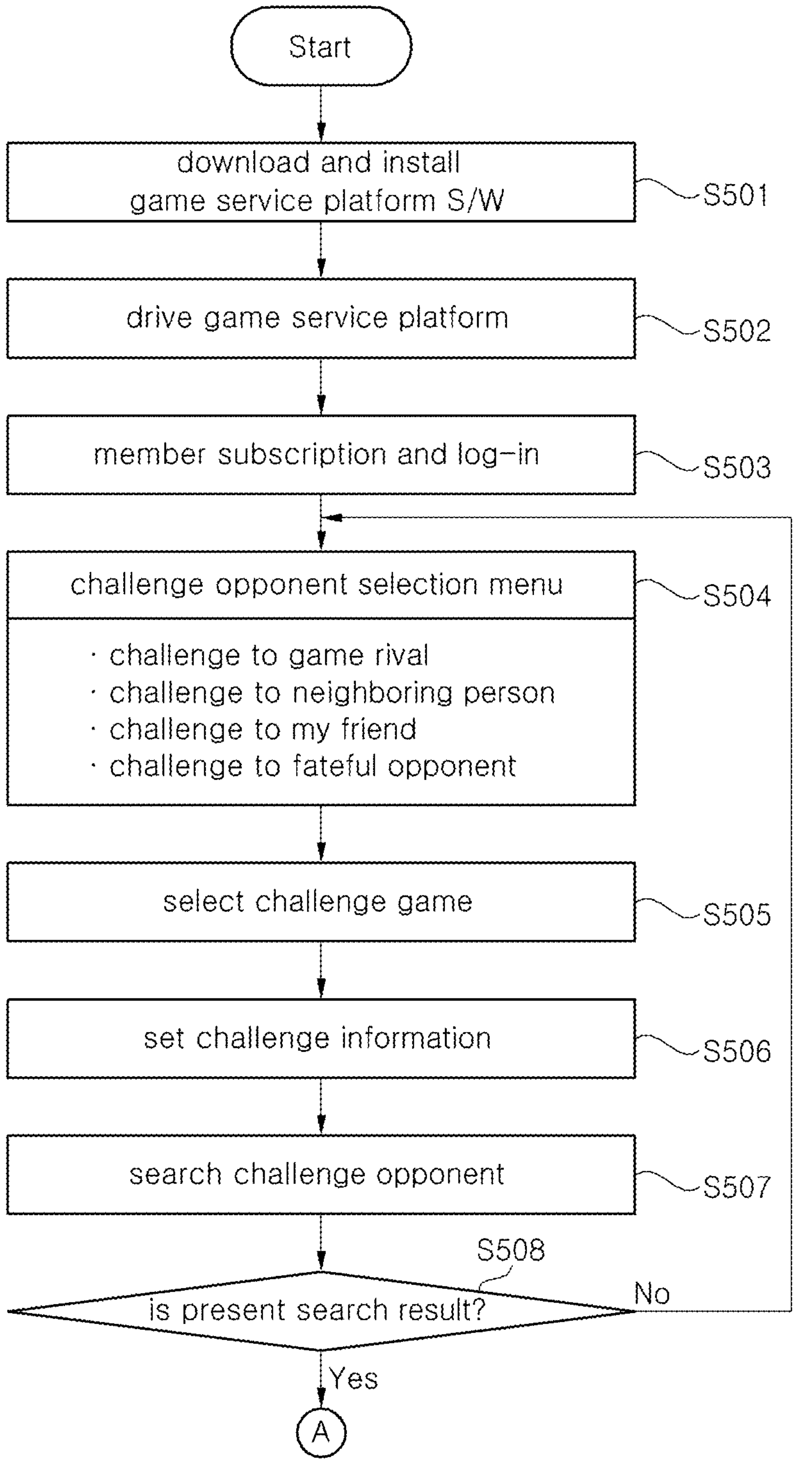
FIG. 5A and FIG. 5B are flowcharts showing a procedure of providing a game through the connection with a challenge opponent according to an exemplary embodiment of the present invention.
Figure 5B:
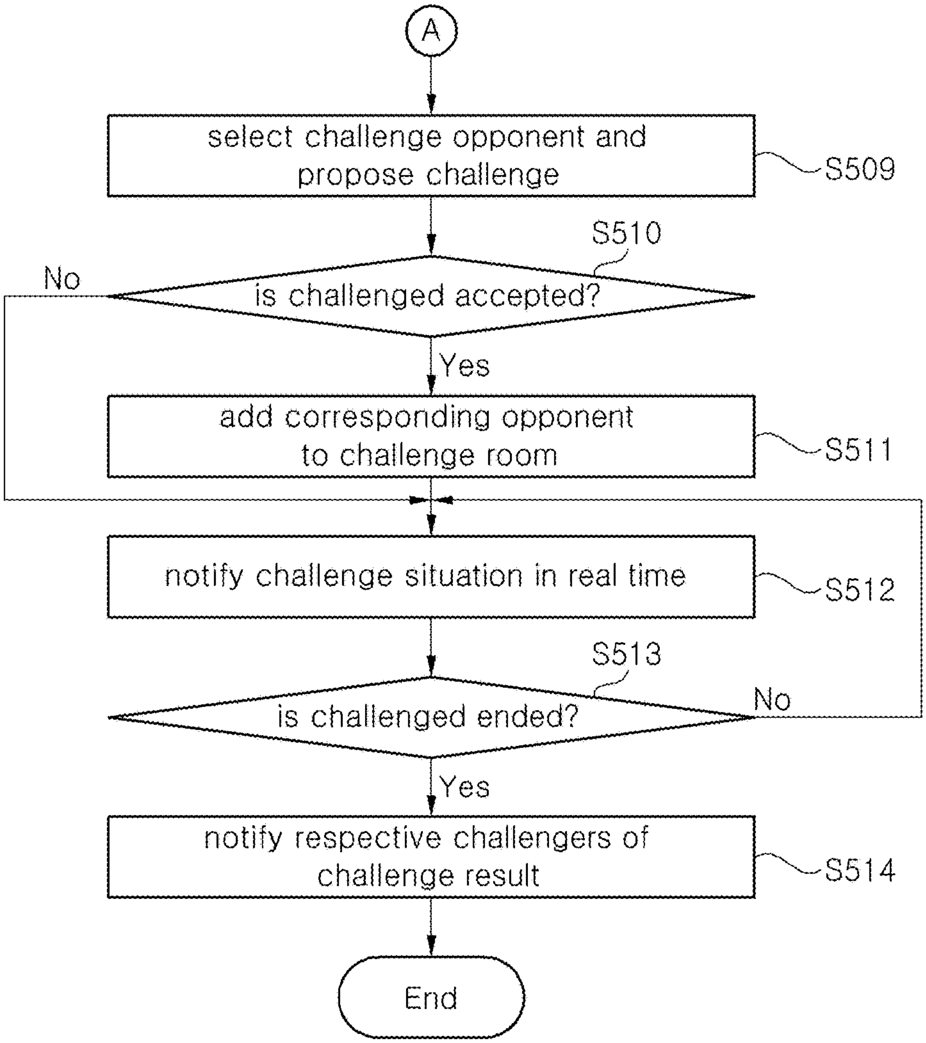

FIGS. 5A and 5B are flowcharts showing a procedure of providing a game through the connection with a challenge opponent according to an exemplary embodiment of the present invention. First, the user of the client terminal 320 (for example, the smart phone) downloads and installs the game platform software (S501) and drives the installed game service platform (S502). After the game service platform is driven, when member subscription and log-in are performed (S503), the home menu of FIG. 2 may be displayed on the client terminal 320.

Then, according to an exemplary embodiment of the present invention, the challenge opponent is searched to select a selectable menu (S504), thereby starting the challenge. For example, as described above, the challenge opponent search method, such as the "challenge to game rival" (See FIG. 7), the "challenge to neighboring person" (See FIG. 8), the "challenge to my friend" (See FIG. 9), the "challenge to fateful opponent" (See FIG. 10), or the like, may be selected.

When the challenge opponent search method is selected as described above, the game to challenge is selected in the respective challenge opponent search menus (S505), various pieces of information (for example, the number of challenge participants, a challenge time, a challenge object, and the like) related to the corresponding challenge is set (S506), and the challenge opponent search (S507) is executed.

In the case in which the search is performed according to the execution of the challenge opponent search and a search result is not present, the procedure of providing a game may return to the challenge opponent selection menu (S504) to re-search the challenge opponent. When at least one user is searched as the challenge opponent search result, a specific user is selected as the challenge opponent to propose the challenge to the challenge opponent (S509).

After challenge proposal information is transmitted to the corresponding user according to the challenge proposal, when the user receiving the challenge proposal accepts the challenge (S510), the user accepting the challenge is added to the challenge room (S511) to perform the challenge together.

As the challenge starts, challenge progress situations (for example, record updating, ranking change, object accomplishment, and the like) are sent to the respective challenges in real time (S512), thereby making it possible to stimulate a winning desire in the challenge participants. After the set challenge time elapses, when the challenge ends (S513), the challenge result is notified to the respective challenge participants (S514).

Although not shown in FIGS. 5A and 5B, in the case in which the game for the challenge is not installed in the user terminal of the user accepting the challenge, a procedure of downloading and installing the corresponding game in various schemes may be added.

As described above, a specific game is selected through the game service platform, and the challenge for the corresponding game is proposed and accepted, thereby making it possible to provide the challenge service. The above-mentioned process is performed, thereby making it possible to increase an interest in the game, and the challenge opponent is added as the game friend, thereby making it possible to expand the human network. In addition, because a challenge period may be set and the game challenge may be performed several times during the corresponding challenge period, the present invention may also be applied to the case of the record game that is not a battle with real-time access, and record situations of the challenge participants are sent to the challenger participants in real time during the challenge progress, thereby making it possible to stimulate a desire of the challenge participants to win.

Implementation Example of Game Service Platform

FIGS. 6 to 12 show implementation examples of a game service platform providing functions related to challenge execution of a smart phone according to an exemplary embodiment of the present invention.

FIG. 6 is a diagram showing a "challenge opponent selection" screen in a smart phone according to an exemplary embodiment of the present invention. Referring to FIG. 6, when the user executes the game service platform and accesses a challenge service home menu, challenge related information 601 and a menu 602 capable of selecting the challenge opponent are provided. For example, information regarding a game level of the user, an ID of the user, a game last executed by the user, and the like, whether the user is currently participating in the challenge, and whether the user has received an invitation, are displayed as the challenge related information 601. In addition, the menu 602 capable of selecting the challenge opponent may include a "game rival" selection menu, a "neighboring person" selection menu, a "my friend" selection menu, a "fateful opponent" selection menu, and the like, as described above. However, the present invention is not limited thereto. The "challenge opponent selection" screen of FIG. 6 is changed into screens of FIGS. 7A to 7D at the time selecting the respective challenge opponent search menus.

In the case in which there is a non-participating valid invitation notification (that is, in a challengeable time), the number of received invitation notifications may be displayed in an invitation item. In this case, an invitation button is clicked, and the corresponding invitation is confirmed (See FIG. 9), thereby making it possible to accept the challenge.

FIGS. 7A to 7D show pages of the respective selected challenge opponent search methods according to an exemplary embodiment of the present invention.

Figure 7A:
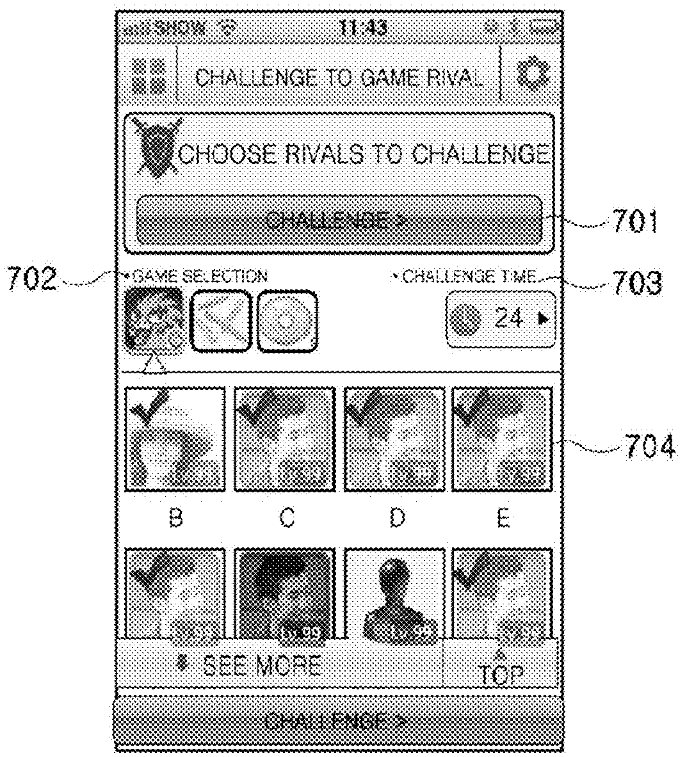
FIG. 7A is a diagram showing a "challenge to game rival" screen in the smart phone according to an exemplary embodiment of the present invention.

FIG. 7A is a diagram showing a "challenge to game rival" screen in the smart phone according to an exemplary embodiment of the present invention. Referring to FIG. 7A, according to selection of the "challenge to game rival" menus, the user searches and displays users having a level of ability (a game level or point) similar to that of him/her.

As a more specific example, users whose game level differs from a game level of the user within 10% or users who have a point total difference no greater than 10% of the point total of the user may be searched and displayed as game rivals having ability similar to each other, but is not necessarily limited to the illustrated condition. In this case, information 704 of the respective searched users may include an ID, a registered profile image, a level, and the like. The user selects at least one of the users listed at a lower end and clicks a "challenge" button positioned at an upper end, thereby making it possible to start the challenge. In addition, a challenge related game selected through a game selection item 702 may be displayed as an image, and the user may set a challenge time (for example, 10 minutes, 1 hour, 24 hours, or the like) through a challenge time item 703. In the case in which the challenge time is not set, it may be considered as a default value.

Figure 7B:
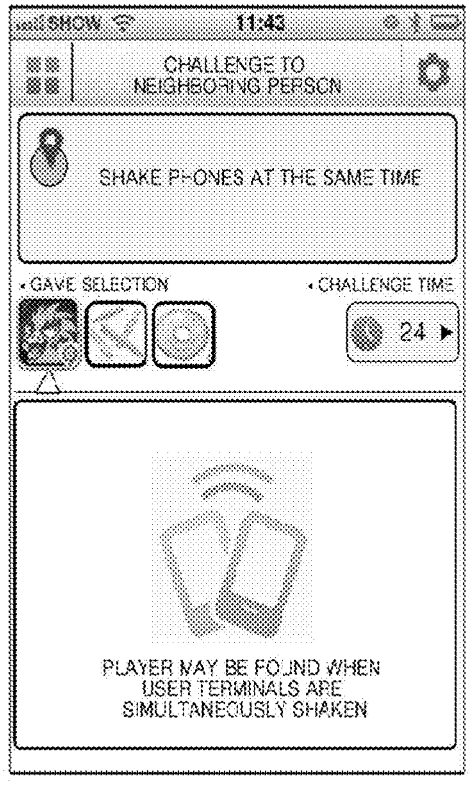
FIG. 7B is a diagram showing a "challenge to neighboring person" screen in the smart phone according to an exemplary embodiment of the present invention.

FIG. 7B is a diagram showing a "challenge to neighboring person" screen in the smart phone according to an exemplary embodiment of the present invention. Referring to FIG. 7B, according to selection of the "challenge to neighboring person" menu, when the user shakes the user terminal, users shaking user terminals together with the user positioned in the vicinity are searched and are recommended as the challenge opponents. That is, position information of the user is used, thereby making it possible to search and display users positioned in the vicinity or display only users that are playing the corresponding game among the users positioned in the vicinity.

Figure 7C:
FIG. 7C is a diagram showing a "challenge to my friend" screen in the smart phone according to an exemplary embodiment of the present invention.

FIG. 7C is a diagram showing a "challenge to my friend" screen in the smart phone according to an exemplary embodiment of the present invention. Referring to FIG. 7C, according to selection of the "challenge to my friend" menu, friends that the user registered are searched and displayed. In this case, a friend last registered by the user may preferentially be exposed, and a friend of a friend may be searched and displayed. In addition, the smart phone may be configured to preferentially expose a heterosexual friend according to the search setting.

Figure 7D:
FIG. 7D is a diagram showing a "challenge to fateful opponent" screen in the smart phone according to an exemplary embodiment of the present invention.

FIG. 7D is a diagram showing a "challenge to fateful opponent" screen in the smart phone according to an exemplary embodiment of the present invention, Referring to FIG. 7D, according to selection of the "challenge to fateful opponent" menu, the user may randomly select any one of the above-mentioned various search methods and the selection result is displayed. In this case, a set recommendation phrase may be provided together with the selection result. For example, in the case in which the selected method is the "game rival search method," recommendation phrases such as "game ability is similar to that of yours," "challenge now when you would like to feel seesaw thrilling tensions!," or the like, may be provided together with the selection result. In addition, in the case in which the randomly selected method is the "challenge to surrounding person" method, recommendation phrases such as "Mr XX, you played a game at the surroundings. Did you happen to meet me just before? Opportunity to make fortuity inevitable! Challenge now!," and the like, may be provided together with the selection result. Further, in the case in which the randomly selected method is the "challenge to friend" method, recommendation phrases such as "You are a friend of Mr. XX. Did you know Mr. XX?Nicely greet Mr. XX and make friends with him" or "Mr. XX and I are already friends. Can I be clearly a good friend of Mr. XX?," and the like, may be provided together with the selection result.

In the case of the method of challenging to the fateful opponent, the user does not select a specific game in advance as shown, but may get a recommendation of a game to challenge and select the game to challenge.

Figure 8:
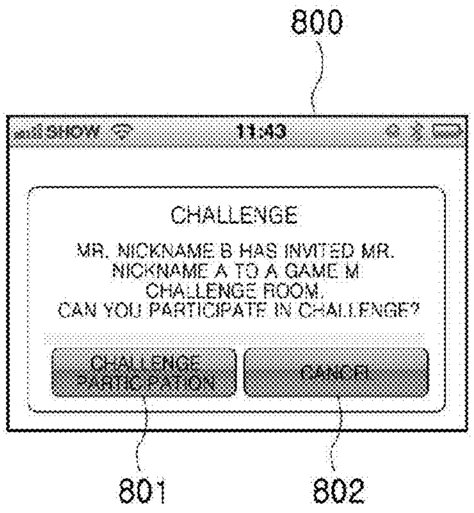
FIG. 8 is a diagram showing a "challenge message transmission to challenge opponent" screen in a smart phone according to an exemplary embodiment of the present invention.

FIG. 8 is a diagram showing a "challenge message transmission to challenge opponent" screen in a smart phone according to an exemplary embodiment of the present invention. Referring to FIG. 8, when the user selects the challenge opponent searched as described above and applies for the challenge opponent for the challenge, a challenge message 800 may be transmitted to the user terminal of the challenge opponent. The transmitted challenge message may include challenge related information, and the challenge opponent may click a "challenge participation" button 801 or a "cancel" button 802 to either participate in the challenge or reject the challenge.

FIG. 9 is a diagram showing a "challenge invitation" screen in the smart phone according to an exemplary embodiment of the present invention; Referring to FIG. 9, when the user applies for the challenge to the challenge opponents and the challenge opponents accept the challenge, such that the challenge starts, a challenge invitation 900 is transferred to the user terminal of the challenge participant accepting the challenge, and information such as a game to challenge, a record to challenge, the number of challenge opponents, a challenge time, an inviting person, and the like, is displayed.

Figure 10:
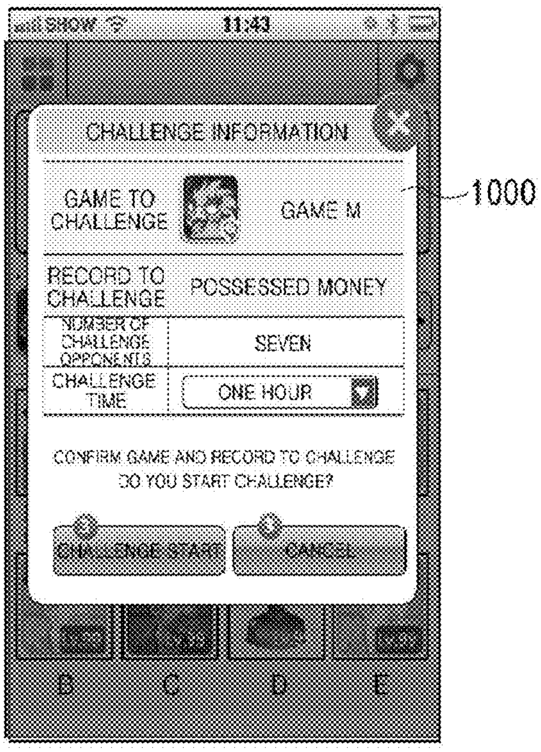
FIG. 10 is a diagram showing a "challenge information" screen in the smart phone according to an exemplary embodiment of the present invention.
Figure 11:
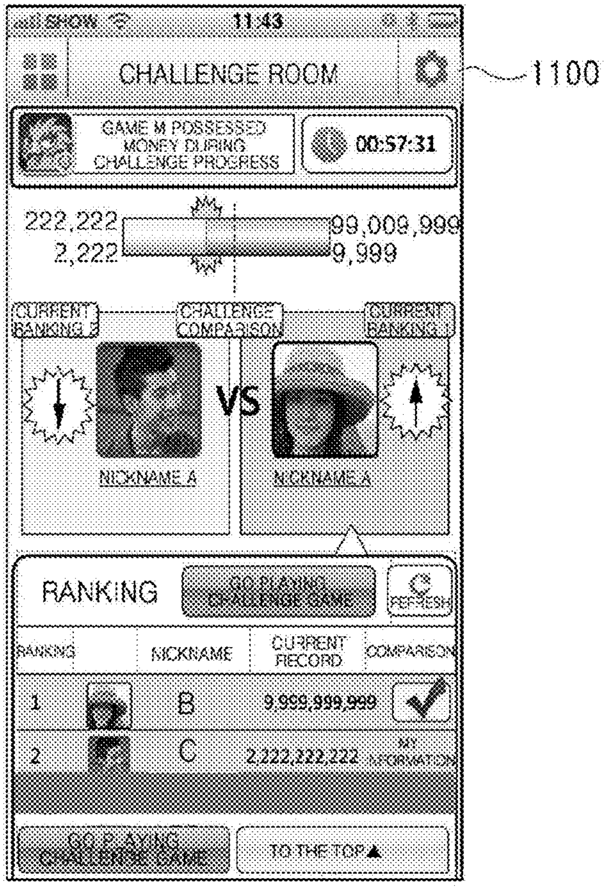
FIG. 11 is a diagram showing a "challenge room inquiry" screen in the smart phone according to an exemplary embodiment of the present invention.

FIG. 10 is a diagram showing a "challenge information" screen in the smart phone according to an exemplary embodiment of the present invention. Referring to FIG. 10, a challenger applicant may confirm challenge information 1000 just before he/she progresses to take the challenge and change challenge related information, such as a challenge time, and the like. FIG. 11 is a diagram showing a "challenge room inquiry" screen in the smart phone according to an exemplary embodiment of the present invention. Referring to FIG. 11, the challenge requester may access a "challenge room 1100" menu during the challenge progress to confirm a current challenge progress situation in real time. For example, records of current ranking 1 and ranking 2 may be compared with each other, rankings and current records of the respective challengers may be displayed. In addition, a challenge game image, title, a remaining challenge time, and the like, may be displayed.

Figure 12:
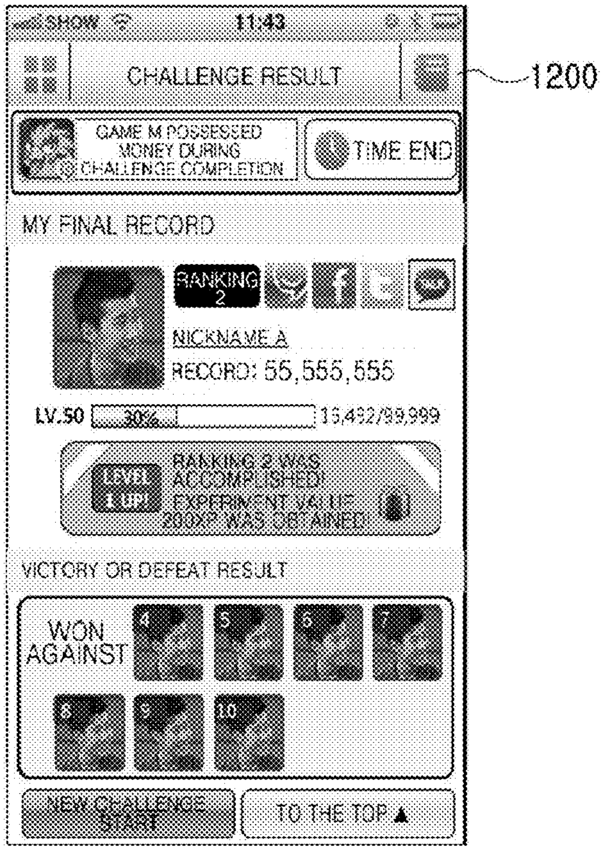
FIG. 12 is a diagram showing a "challenge result" screen in the smart phone according to an exemplary embodiment of the present invention.

FIG. 12 is a diagram showing a "challenge result" screen in the smart phone according to an exemplary embodiment of the present invention. Referring to FIG. 12, after a set challenge time elapses, when the challenge ends, a challenge result screen 1200 may be displayed as shown. A final record, an accomplished object, an obtained point, a victory or defeat result (for example, persons defeated by me, persons drawn with me, persons beating me, and the like) may also be displayed on the challenge result screen 1200.

The exemplary embodiments according to the present invention are implemented in a form of program commands capable of being performed through various computer components to thereby be recordable in a computer-readable recording medium. The computer readable medium may include program instructions, data files, data structure, or the like, alone or a combination thereof. The program command recorded in the computer-readable recording medium may be designed and constituted especially for the present invention, or may be known to those skilled in a field of computer software. Examples of the computer-readable recording medium may include a magnetic medium such as a hard disk, a floppy disk, and a magnetic tape; an optical recording medium such as a CD-ROM, a DVD; a magneto-optical medium such as a floptical disk; and a hardware device specially constituted to store and perform program commands such as a ROM, a RAM, a flash memory, or the like. Examples of the program commands may include machine language codes such as being made by compilers as well as high-level language codes capable of being executed by computers using interpreters, or the like. The hardware device may be constituted to be operated as one more software modules in order to perform the action according to the present invention, and vice versa.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

It will be apparent to those skilled in the art that various modifications and variations can be made in the present invention without departing from the spirit or scope of the invention. Thus, it is intended that the present invention cover the modifications and variations of the invention provided they come within the scope of the appended claims and their equivalents.

What is claimed is:

1. A method for providing a game through a connection with a challenge opponent, performed by a game service platform server managing a plurality of games, the method comprising:

receiving challenge game selection information and challenge opponent request information regarding a challenge applicant over a communication network from a first terminal associated with the challenge applicant;

searching and recommending other users positioned in the vicinity of the challenge applicant as the challenge opponents in response to the game selection information and challenge opponent request information by simultaneously shaking the first terminal by the challenge applicant and terminals of the other users positioned in the vicinity of the challenge applicant;

transmitting challenge application information to a second terminal selected from the shaken terminals of the other users positioned in the vicinity of the challenge applicant, which is a terminal of at least one member specified based on a user selection;

setting a member accepting a challenge to the challenge opponent based on challenge acceptance information received from the second terminal;

transmitting game progress situations of the challenge applicant and the challenge opponent to terminals of the challenge applicant and the challenge opponent in real time; and transmitting the game progress situations and challenge results to a social network service (SNS) server interconnected with the game service platform, wherein:

the first terminal and the second terminal are configured to execute a game service platform for managing the plurality of games and provide the challenge opponent request information and the challenge acceptance information through the game service platform, respectively;

the game service platform server provides the first terminal with a user interface for selecting one of a plurality of stored search methods for searching a plurality of challenge opponent candidates and selecting the challenge opponent from the plurality of challenge opponent candidates; and the plurality of stored search methods comprises searching game friends registered by the challenge applicant and displaying a list of the search result as the challenge opponent candidates.

2. The method of claim 1, further comprising using the selected search method for searching at least one of members installing at least one of the plurality of games managed by the game service platform server as challenge opponent candidates and providing information regarding the searched member to the first terminal, based on the challenge game selection information and the challenge opponent request information, wherein in the transmitting of the challenge application information, selection information regarding at least one specific member among the searched challenge opponent candidates is received from the first terminal, and the challenge application information is transmitted to the second terminal, which is a terminal of a member corresponding to the received selection information.

3. The method of claim 2, wherein in the searching at least one of the members installing at least one of the plurality of games managed by the game service platform server as the challenge opponent candidates, selection information regarding the selected search method is received from the first terminal, and the challenge opponent candidates are searched by the selected search method.

4. The method of claim 1, further comprising transmitting game results to terminals of the challenge applicant and the challenge opponent when the game ends.

5. The method of claim 4, further comprising:

receiving challenge period information of the first terminal; and determining a game end point in time based on the challenge period information.

6. A system for providing a game through a connection with a challenge opponent, the system comprising a game service platform server comprising:

a challenge opponent searching unit configured to receive challenge game selection information and challenge opponent request information of a challenge applicant over a communication network from a first terminal associated with the challenge applicant, and to search and recommend other users positioned in the vicinity of the challenge applicant as the challenge opponents in response to the game selection information and challenge opponent request information by simultaneously shaking the first terminal by the challenge applicant and terminals of the other users positioned in the vicinity of the challenge applicant;

a challenge proposal processing unit configured to transmit challenge application information to a second terminal selected from the shaken terminals of the other users positioned in the vicinity of the challenge applicant, which is a terminal of at least one member specified based on a user selection;

a challenge acceptance processing unit configured to set the member accepting a challenge to the challenge opponent based on challenge acceptance information received from the second terminal;

a challenge notification processing unit configured to transmit game progress situations of the challenge applicant and the challenge opponent to terminals of the challenge applicant and the challenge opponent in real time; and a social network service (SNS) interworking processing unit configured to provide the game progress situations and challenge results to an SNS server interconnected with the game service platform, wherein:

the first user terminal and the second user terminal are configured to execute a game service platform for managing the plurality of games and to provide the challenge opponent request information and the challenge acceptance information through the game service platform, respectively; and the game service platform server provides the first terminal with a user interface for selecting one of a plurality of stored search methods for searching a plurality of challenge opponent candidates and selecting the challenge opponent from the plurality of challenge opponent candidates, the plurality of stored search methods comprising a method that searches game friends registered by the challenge applicant and displays a list of the search result as the challenge opponent candidates.

7. The system of claim 6, wherein the challenge opponent searching unit is configured to search at least one of members installing at least one of the plurality of games managed by the game service platform server as challenge opponent candidates according to the selected search method and to further provide information regarding the searched member to the first terminal, based on the challenge game selection information and the challenge opponent request information, and wherein the challenge proposal processing unit is configured to further receive selection information regarding at least one specific member among the searched challenge opponent candidates from the first terminal and to transmit the challenge application information to the second terminal, which is a terminal of a member corresponding to the received selection information.

8. The system of claim 7, wherein the challenge opponent searching unit is configured to receive selection information regarding the selected search method from the first terminal and to search the challenge opponent candidates by the selected search method.

9. The system of claim 8, wherein the stored search methods further include a method that searches and recommends members to be challenge opponent candidates whose game record information differs from game record information of the challenge applicant within a similar game ability range among the members.

10. The system of claim 8, wherein the stored search methods further include a method that searches and recommends members positioned within a distance range from a position of the first terminal as the challenge opponent candidates.

11. The system of claim 6, wherein the challenge notification processing unit is configured to transmit game results to terminals of the challenge applicant and the challenge opponent.

12. A non-transitory computer-readable storage medium comprising an executable program which, when executed, provides a game through connection with a challenge opponent, performed by a game service platform server managing a plurality of games, the method comprising:

receiving challenge game selection information and challenge opponent request information regarding a challenge applicant over a communication network from a first terminal associated with the challenge applicant;

searching and recommending other users positioned in the vicinity of the challenge applicant as the challenge opponents in response to the game selection information and challenge opponent request information by simultaneously shaking the first terminal by the challenge applicant and terminals of the other users positioned in the vicinity of the challenge applicant;

transmitting challenge application information to a second terminal selected from the shaken terminals of the other users positioned in the vicinity of the challenge applicant, which is a terminal of at least one member specified based on a user selection;

setting a member accepting a challenge to the challenge opponent based on challenge acceptance information received from the second terminal;

transmitting game progress situations of the challenge applicant and the challenge opponent to terminals of the challenge applicant and the challenge opponent in real time; and transmitting the game progress situations and challenge results to a social network service (SNS) server interconnected with the game service platform, wherein:

the first terminal and the second terminal are configured to execute a game service platform for managing the plurality of games and provide the challenge opponent request information and the challenge acceptance information through the game service platform, respectively;

the game service platform server provides the first terminal with a user interface for selecting one of a plurality of stored search methods for searching a plurality of challenge opponent candidates and selecting the challenge opponent from the plurality of challenge opponent candidates; and the plurality of stored search methods comprises searching game friends registered by the challenge applicant and displaying a list of the search results as the challenge opponent candidates.

13. The method of claim 1, wherein the searching of game friends registered by the challenge applicant and displaying a list of the search results as the challenge opponent candidates further comprises searching and displaying a friend of a friend.

14. The method of claim 6, wherein the method that searches game friends registered by the challenge applicant and displays a list of the search results as the challenge opponent candidates further comprises searching and displaying a friend of a friend.

15. The method of claim 12, wherein the searching of game friends registered by the challenge applicant and displaying a list of the search results as the challenge opponent candidates further comprises searching and displaying a friend of a friend.

* * * * *